(12) United States Patent
Itoh et al.

(10) Patent No.: US 7,960,030 B2
(45) Date of Patent: Jun. 14, 2011

(54) FREE FILMS MADE OF CURED ORGANOPOLYSILOXANE RESINS, PROCESS FOR PRODUCTION THEREOF, AND LAMINATED FILMS

(75) Inventors: Maki Itoh, Tokyo (JP); Michitaka Suto, Odawara (JP); Nobuo Kushibiki, Fujisawa (JP); Katsuya Eguchi, Minamiashigara (JP)

(73) Assignee: Dow Corning Corporation, Midland, MI (US)

( * ) Notice: Subject to any disclaimer, the term of this patent is extended or adjusted under 35 U.S.C. 154(b) by 1020 days.

(21) Appl. No.: 11/569,104

(22) PCT Filed: May 13, 2005

(86) PCT No.: PCT/JP2005/009221
§ 371 (c)(1),
(2), (4) Date: Jun. 28, 2007

(87) PCT Pub. No.: WO2005/111149
PCT Pub. Date: Nov. 24, 2005

(65) Prior Publication Data
US 2008/0318067 A1 Dec. 25, 2008

(30) Foreign Application Priority Data
May 14, 2004 (JP) .................... 2004-145046

(51) Int. Cl.
B32B 15/08 (2006.01)
B29C 71/00 (2006.01)
C08F 283/12 (2006.01)
C08J 5/18 (2006.01)

(52) U.S. Cl. .................. 428/450; 264/236; 264/331.11; 428/447; 525/478

(58) Field of Classification Search .................. 264/236, 264/331.11; 428/447, 450; 525/478
See application file for complete search history.

(56) References Cited

U.S. PATENT DOCUMENTS

| | | | |
|---|---|---|---|
| 3,313,773 | A | 4/1967 | Lamoreaux |
| 4,198,131 | A | 4/1980 | Birdsall et al. |
| 2003/0171477 | A1 | 9/2003 | Baba et al. |
| 2005/0227091 | A1 | 10/2005 | Suto et al. |

FOREIGN PATENT DOCUMENTS

| | | |
|---|---|---|
| EP | 0682271 A1 | 11/1995 |
| JP | 54130948 | 10/1979 |
| JP | 61167408 | 7/1986 |
| JP | 7294701 | 11/1995 |
| JP | 7306301 | 11/1995 |
| JP | 8134358 | 5/1996 |
| JP | 2001138340 | 5/2001 |
| JP | 2002356617 | 12/2002 |
| JP | 2004361692 | 12/2004 |
| WO | WO0174927 | 10/2001 |
| WO | WO03104329 | 12/2003 |
| WO | WO2004090041 | 10/2004 |

OTHER PUBLICATIONS

English language abstract for JP7294701 extracted from espacenet.com Jan. 31, 2007.
English language abstract for JP7306301 extracted from espacenet.com Jan. 26, 2007.
English language abstract for JP8134358 extracted from espacenet.com Jan. 31, 2007.
English language abstract for JP54130948 extracted from espacenet.com Jan. 31, 2007.
English language abstract for JP611674081 extracted from espacenet.com Jan. 31, 2007.
English language abstract for JP2001138340 extracted from espacenet.com Jan. 31, 2007.
English language abstract for JP2002356617 extracted from espacenet.com Jan. 26, 2007.
English language abstract for JP2004361692 extracted from espacenet.com Jan. 26, 2007.
English language abstract for WO0174927 extracted from espacenet.com Jan. 26, 2007.
English language abstract for WO03104329 extracted from espacenet.com Jan. 26, 2007.

*Primary Examiner* — D. S Nakarani
(74) *Attorney, Agent, or Firm* — Howard & Howard Attorneys PLLC

(57) ABSTRACT

A free-standing film comprising a cured organopolysiloxane resin obtained by conducting a cross-linking reaction between (A) an organopolysiloxane resin represented by the following average siloxane unit formula: $[R^1_a R^2_{3-a}SiO_{1/2}]_v$ $[R^3SiO_{3/2}]_w$ (1) or $[R^1_a R^2_{3-a}SiO_{1/2}]_x[R^3SiO_{3/2}]_y[SiO_{4/2}]_z$ (2) (where $R^1$ designates univalent hydrocarbon groups of one or more than one type selected from alkyl groups having 1 to 4 carbon atoms and univalent aromatic hydrocarbon groups having 6 to 8 carbon atoms; $R^2$ designate alkenyl groups having 2 to 6 carbon atoms; $R^3$ designates alkyl groups with 1 to 4 carbon atoms or univalent aromatic hydrocarbon groups having 6 to 8 carbon atoms; at least 50 mole % of $R^3$ groups being phenyl groups; "a" is 0, 1, or 2; $0.8 \leq w < 1.0$ and $v+w=1$; $0<x<0.4$, $0.5<y<1$, $0<z<0.4$, and $x+y+z=1$); and (B) an organosilicon compound that contains in one molecule two or more silicon-bonded hydrogen atoms, in which not less than 5 mole % of all silicon-bonded univalent groups are univalent aromatic hydrocarbon groups, in the presence of (C) a hydrosilylation catalyst.

8 Claims, No Drawings

FREE FILMS MADE OF CURED ORGANOPOLYSILOXANE RESINS, PROCESS FOR PRODUCTION THEREOF, AND LAMINATED FILMS

RELATED APPLICATIONS

This application claims priority to and all the advantages of International Patent Application No. PCT/JP2005/009221, filed on May 13, 2005, which claims priority to Japanese Patent Application No. 2004-145046, filed on May 14, 2004.

TECHNICAL FIELD OF THE INVENTION

The present invention relates to a free-standing film comprising a cured organopolysiloxane resin and to a process for manufacturing the aforementioned film. More specifically, the present invention relates to a free-standing film and to a process for manufacturing a free-standing film which is made from an organopolysiloxane and which possesses optical transparency, excellent heat-resistant properties, high glass-transition temperature, and low coefficient of thermal expansion. In particular, the present invention relates to the aforementioned film and to a process for manufacturing the aforementioned film of the type suitable for use as a material for manufacturing transparent electrode films, TFT electrode films, or similar optoelectronic elements; wave-length filters, polarization elements, or similar optical elements; as well as electronics materials with excellent insulating and heat-resistant properties. The present invention also relates to a layered film having an inorganic layer on the aforementioned film.

BACKGROUND ART OF THE INVENTION

In recent years, light weight transparent polymer films have been extensively used in the field of displays exemplified by cellular phone displays. Polymer films are also considered to be one of the essential components for a so-called "paper-type display"—a product of emerging technology. Polymers in the form of films which are most suitable for use in various fields include polyethylene, polypropylene, polyethylene terephthalate, or similar crystalline polymer, and polycarbonate, polymethylmethacrylate, or similar amorphous polymer. All these materials are thermoplastic polymers that can be easily formed into films of various types by adjusting the molecular weight and molecular-weight distribution. At the present time, a great variety of highly transparent polymer films available on the market are made from thermoplastic polymers. For example, such films are produced by subjecting a hot-molten thermoplastic polymer to calender treatment, or by extruding the polymer through a T-die. It is also known to produce transparent polymer films by subjecting crystalline polymers to biaxial stretching.

It is known that orientation of high-molecular chains in films made from thermoplastic polymers presents a problem since such an orientation is inherent in the methods themselves used for the manufacture of such films. For example, the molecular chains of a hot-molten polymer are oriented under the effect of calender rollers when the thermoplastic polymer is subjected to calendar treatment or under the effect of extrusion forces when the aforementioned polymer is extruded through a T-die in an extrusion process. Furthermore, stretching of a polymer film is always accompanied by orientation of the polymer chains in the stretching direction. However, the aforementioned phenomenon of molecular chain orientation may present a problem for transparent films. This is because orientation of polymer chains in a transparent film generates birefringence. Therefore, practical application of transparent films of thermoplastic polymers as an optical material presents difficulties. A source of orientation of macromolecules is the stress applied to the material in a hot-molten state. However, during molding in a mold, application of a certain stress to a hot-molten material is inevitable. In order to suppress molecular orientation in films, such methods as cast molding were developed. Nevertheless, manufacture of thermoplastic polymer films, even by cast molding, still suffers from a lot of problems. For example, evaporation of unreacted monomers of thermoplastic polymers, solvents used in cast molding, and various additives introduced, e.g., for imparting heat-resistant properties, from the surfaces of the films contaminates the surrounding environment. To prevent unreacted monomers from evaporation, the synthesized thermoplastic polymers could be purified before obtaining the cast molding solution, but evaporation of the solvent can not be avoided. Furthermore, such processes require additional costs and production time. Besides, films produced from thermoplastic polymers normally have low resistance to heat and are rarely used for manufacture of electronic parts that operate under heat-generating conditions since at high temperatures such parts lose their mechanical strength. Known in the art are thermoplastic amorphous polymers with high heat-resistant properties, such as polysulfone. However, polysulfone has light absorption in the vicinity of 400 nm, and therefore cannot be efficiently used as an optical material in view of its light transmittance characteristics.

Let us now consider the formation of films from thermosetting resins, e.g., from cross-linkable polymers that possess excellent heat-resistant properties. In the case when a cross-linkable polymer is used, a liquid monomer or a low-molecular-weight prepolymer acquires a predetermined shape by being cross-linked and therefore does not require application of stress and is not subject to molecular orientation. Furthermore, if a film made from a cross-linkable polymer such as a thermosetting resin contains residual monomers, e.g., a low-molecular-weight compound, the latter is captured into the three-dimensional polymer network and diffusion from the film is suppressed. Therefore, manufacture of such films is free of problems inherent in mold-casting from the aforementioned thermoplastic resins.

In a majority of cases, however, the films made from cross-linkable polymers such as thermosetting resins are provided in a state held on a prescribed substrate or coated on a prescribed substrate. It was difficult to manufacture any free-standing film made of cross-linkable polymers that can be used without being held on a substrate. In particular, it is possible to manufacture transparent films made from curable organopolysiloxane compositions having excellent resistance to heat, resistance to ultraviolet radiation, anti-oxidation properties, etc., without addition of heat-resistant agents, UV absorbants, or antioxidants. However, such films are held on substrates, and free-standing films, i.e., unsupported films made of cured organopolysiloxanes that possess physical properties sufficient for practical use are still absent from the market. The inventors herein developed a free-standing film that is characterized by high heat-resistant properties, excellent transparency in the visible-light range, and low birefringence. The inventors also developed layered films having an inorganic layer on the aforementioned free-standing film made of cured organopolysiloxanes. These films are disclosed in International Patent Application Publication WO 03/104329.

However, WO 03/104329 does not disclose a free-standing film comprising a cured organopolysiloxane that has a high deformation temperature, i.e., glass-transition temperature that can withstand high temperatures occurring in the below-described processes for forming an inorganic-compound layer, and that has a small coefficient of thermal expansion. For example, in the manufacture of displays from the aforementioned films, the inventors encountered a problem of mismatch between a thermal expansion coefficient of the substrate film and a thermal expansion coefficient of a vapor-deposited layer.

DISCLOSURE OF THE INVENTION

In an attempt to solve the above problem, the inventors herein conducted a profound study with regard to the effect of phenyl siloxane units or the effect of cross-linking density determined by measuring dynamic viscoelasticity on thermal characteristics of the film. The results of this study revealed the types of siloxane units that can control thermal characteristics of the films, as well as ratios between such units, silicon-bonded organic groups, and their quantities. In view of the above, it is an object of the present invention to provide a free-standing film that in response to improved physical characteristics required from polymer films possesses an improved glass transition point and coefficient of thermal expansion, i.e., an increased glass transition temperature and a reduced coefficient of thermal expansion. The present invention also provides a process for manufacturing the free-standing film and a layered film composed of the aforementioned film and an inorganic layer coated thereon.

More specifically, the present invention relates to:

[1] a free-standing film comprising a cured organopolysiloxane resin obtained by conducting a cross-linking reaction between
(A) an organopolysiloxane resin represented by the following average siloxane unit formula:

    (1) or

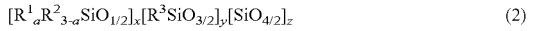    (2)

(where $R^1$ designates univalent hydrocarbon groups of one or more than one type selected from alkyl groups having 1 to 4 carbon atoms and univalent aromatic hydrocarbon groups having 6 to 8 carbon atoms; $R^2$ designates alkenyl groups having 2 to 6 carbon atoms; $R^3$ designates univalent hydrocarbon groups of one or more than one type selected from alkyl groups with 1 to 4 carbon atoms and univalent aromatic hydrocarbon groups having 6 to 8 carbon atoms; at least 50 mole % of $R^3$ groups being phenyl groups; "a" is 0, 1, or 2; $0.8 \leq w < 1.0$ and $v+w=1$; $0<x<0.4$, $0.5<y<1$, $0<z<0.4$, and $x+y+z=1$); and
(B) an organsilicon compound that contains in one molecule two or more silicon-bonded hydrogen atoms, in which not less than 5 mole % of all silicon-bonded univalent groups are univalent aromatic hydrocarbon groups, in the presence of (C) a hydrosilylation catalyst;

[2] the free-standing film of item [1], wherein the cured organopolysiloxane resin does not have a specific light-absorption band in the visible-light range, has a light transmittance of 85% or higher at the wavelength of 400 nm, and a light transmittance of 88% or higher in the wavelength range of 500 to 700 nm;

[3] the free-standing film of item [2], wherein the glass transition point of the cured organopolysiloxane resin is equal to or greater than 100° C. and the coefficient of thermal expansion at 100° C. is equal to or less than 200 ppm/K;

[4] a process for manufacturing a free-standing film comprising a cured organopolysiloxane resin comprising the steps of:
coating a cross-linkable organopolysiloxane resin composition comprising:
(A) an organopolysiloxane resin represented by the following average siloxane unit formula:

    (1) or

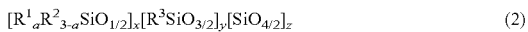    (2)

(where $R^1$ designates univalent hydrocarbon groups of one or more than one type selected from alkyl groups having 1 to 4 carbon atoms and univalent aromatic hydrocarbon groups having 6 to 8 carbon atoms; $R^2$ designates alkenyl groups having 2 to 6 carbon atoms; $R^3$ designates univalent hydrocarbon groups of one or more than one type selected from alkyl groups with 1 to 4 carbon atoms and univalent aromatic hydrocarbon groups having 6 to 8 carbon atoms; at least 50 mole % of $R^3$ groups being phenyl groups; "a" is 0, 1, or 2; $0.8 \leq w < 1.0$ and $v+w=1$; $0<x<0.4$, $0.5<y<1$, $0<z<0.4$, and $x+y+z=1$);
(B) an organsilicon compound that contains in one molecule two or more silicon-bonded hydrogen atoms, in which not less than 5 mole % of all silicon-bonded univalent groups are univalent aromatic hydrocarbon groups, and (C) a hydrosilylation catalyst onto a substrate to form an uncured film;
forming a cured film by cross-linking the aforementioned uncured film; and
peeling the aforementioned cured film off from the substrate;

[5] the process for manufacturing the free-standing film according to item [4], wherein a cured organopolysiloxane resin does not have a specific light-absorption band in the visible-light range, has a light transmittance of 85% or higher at the wavelength of 400 nm, and a light transmittance of 88% or higher in the wavelength range of 500 to 700 nm.

[6] the process for manufacturing a free-standing film according to item [5], wherein the glass transition temperature of a cured organopolysiloxane resin is equal to or greater than 100° C. and the coefficient of thermal expansion of a cured organopolysiloxane resin at 100° C. is equal to or below 200 ppm/K;

[7] a layered film comprising the aforementioned free-standing film of item [1] and an inorganic layer on said film;

[8] the layered film according to item [7], wherein the inorganic layer is a deposited layer of a metal or a metal oxide;

[9] the layered film according to item [7], wherein the inorganic layer is a gas-barrier layer;

[10] the layered film according to item [7], wherein the inorganic layer is composed of a gas-barrier layer and a vapor-deposited metal or a metal-oxide layer.

The film of the present invention comprising a cured organopolysiloxane resin can be used as a free-standing film due to its excellent physical and mechanical properties. In other words, the film of the present invention can be used independently of a substrate because it does not develop cracks irrespective of whether or not it is supported by a substrate and because, in a free state, it does not form cracks and does not break after multiple bends. Since the material of the free-standing film of the present invention comprising a cured organopolysiloxane resin is cross-linked, it possesses high resistance to heat and does not flow even at high temperatures. Furthermore, the film has a high glass-transition temperature, i.e., high point of thermal deformations and, hence, a low coefficient of thermal expansion. The free-standing film of the present invention comprising a cured organopolysiloxane resin demonstrates good light transmittance and absence of birefringence in the wavelength range of visible light, i.e., in the range from the near-ultraviolet to near-infrared light. Moreover, the film of the present invention is characterized by an excellent property of independence of light transmittance from polarized light. The film demonstrates good optical properties even in the polarized light and in coherent light.

When the free-standing film of the present invention comprising a cured organopolysiloxane resin is coated with a thin layer of an inorganic material, e.g., with a thin metal or metal-oxide film, it is stable even under film-forming conditions, e.g., when oxygen contained in the surrounding environment is activated under the effect of high-energy treatment, such as sputtering. Therefore, due to high heat-resistant properties, a layer of an inorganic material can be formed on the free-standing film by vacuum film forming methods.

The process of the present invention makes it possible to produce the free-standing film of the present invention comprising a cured organopolysiloxane resin with ease and high efficiency.

When a layer of an inorganic material coated onto the free-standing film of the present invention comprising a cured organopolysiloxane resin is a transparent electrode material, the aforementioned inorganic layer can be used as an electroluminescence display, liquid crystal display, or a similar voltage-applied electrode of a thin-film display. Such layered films can also be used as various [optical] filters, reflection plates, or similar optical elements. By adjusting the electric resistance of the inorganic layer, it becomes possible to use the layered films as charge eliminators and electromagnetic shielding screens. By adjusting the refractive index of the inorganic layer, it is possible to impart to the inorganic material layer functions of an anti-reflective film. Since the free-standing film of the present invention comprising a cured organopolysiloxane resin is stable against chemical treatment, the film is suitable for selective removal of the inorganic layer by various etching processes, e.g., for electrode patterning.

BEST MODE FOR CARRYING OUT THE INVENTION

The present invention provides a free-standing film comprising a cured organopolysiloxane resin obtained by conducting a cross-linking reaction between (A) an organopolysiloxane resin represented by the following average siloxane unit formula:

   (1) or

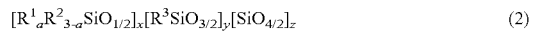   (2)

(where $R^1$ designates univalent hydrocarbon groups of one or more than one type selected from alkyl groups having 1 to 4 carbon atoms and univalent aromatic hydrocarbon groups having 6 to 8 carbon atoms; $R^2$ designates alkenyl groups having 2 to 6 carbon atoms; $R^3$ designates univalent hydrocarbon groups of one or more than one type selected from alkyl groups with 1 to 4 carbon atoms and univalent aromatic hydrocarbon groups having 6 to 8 carbon atoms; at least 50 mole % of $R^3$ groups being phenyl groups; "a" is 0, 1, or 2; $0.8 \leq w < 1.0$ and $v+w=1$; $0<x<0.4$, $0.5<y<1$, $0<z<0.4$, and $x+y+z=1$); and (B) an organosilicon compound that contains in one molecule two or more silicon-bonded hydrogen atoms and, in which not less than 5 mole % of all silicon-bonded univalent groups are univalent aromatic hydrocarbon groups, in the presence of (C) a hydrosilylation catalyst.

In the formulas (1) and (2) of the average siloxane unit, an alkyl group having 1 to 4 carbon atoms designated by $R^1$ is exemplified by a methyl, ethyl, n-propyl, isopropyl, n-butyl, isobutyl, sec-butyl, and tert-butyl group. A univalent aromatic hydrocarbon group with 6 to 8 carbon atoms alternatively designated by $R^1$ may be exemplified by a phenyl, tolyl, or xylyl group, of which phenyl group is most preferable from the viewpoint of heat-resistant properties, reactivity, and ease of manufacture. In the above formulas, an alkenyl group with 2 to 6 carbon atoms designated by $R^2$ may be exemplified by a vinyl, 1-propenyl, allyl, isopropenyl, 1-butenyl, 2-butenyl, and 1-hexenyl group. The vinyl group is most preferable from the viewpoint of hydrosilylation reactivity and ease of manufacture. In the above formulas, an alkyl group with 1 to 4 carbon atoms designated by $R^3$ may be exemplified by a methyl, ethyl, n-propyl, isopropyl, n-butyl, isobutyl, sec-butyl, and tert-butyl group, of which the most preferable is a methyl group. A univalent aromatic hydrocarbon group with 6 to 8 carbon atoms alternatively designated by $R^3$ is exemplified by a phenyl, tolyl, or xylyl group, of which phenyl group is most preferable from the viewpoint of thermal properties of a cured organopolysiloxane resin and ease of manufacture thereof. From the viewpoint of heat-resistant properties of a cured organopolysiloxane resin, it is preferable that at least 50 mole % of all groups designated by $R^3$ be phenyl groups.

In formulas (1) and (2) of the average siloxane units, "a" is 0, 1, or 2, of which 2 is preferable. It is not a problem if the unit $[R^1_a R^2_{3-a} SiO_{1/2}]$ contains two or three alkenyl groups but they will not be efficiently used in the cross-linking reaction. It is recommended to fulfill the following conditions: $v+w=1$ and $0.8 \leq w < 1.0$. Beyond the limits of these conditions, it will be difficult to impart desired properties to a cured organopolysiloxane resin. The following condition is preferable: $0.82 \leq w < 1.0$. Furthermore, the following conditions have to be satisfied: $x+y+z=1$; $0<x<0.4$; $0.5<y<1$; $0<z<0.4$. Beyond these limits, a cured organopolysiloxane cannot acquire the desired characteristics. The most preferable conditions are the following: $0<x<0.3$; $0.65<y<1$; $0<z<0.2$.

The organopolysiloxane resin represented by the average siloxane unit of formula (1) can be exemplified by the following: $[ViMe_2SiO_{1/2}]_v[PhSiO_{3/2}]_w$. The organopolysiloxane resin represented by the average siloxane unit of formula (2) can be exemplified by the following: $[ViMe_2SiO_{1/2}]_x[PhSiO_{3/2}]_y[SiO_{4/2}]_z$ (here and hereinafter, Me stands for methyl, Ph stands for phenyl, Vi stands for vinyl). The aforementioned organopolysiloxane resins can be used in combination of two or more.

The $[R^1_a R^2_{3-a} SiO_{1/2}]$ unit in formulas (1) and (2) may be exemplified by the $Me_2ViSiO_{1/2}$ unit and the $MeVi_2SiO_{1/2}$ unit, while the $[R^3 SiO_{3/2}]$ unit may be exemplified by the $PhSiO_{3/2}$ unit and the $MeSiO_{3/2}$ unit.

The organosilicon compound of component (B) that contains in one molecule two or more silicon-bonded hydrogen atoms, in which not less than 5 mole % of all silicon-bonded univalent groups are univalent aromatic hydrocarbon groups may be exemplified by a silylated hydrocarbon, organosilane, organosiloxane oligomer, or organopolysiloxane. There are no special restrictions with regard to the molecular structure of component (B), but for better transparency of a cured body, component (B) should be compatible with that of component (A), i.e., its molecular structure should be similar to the molecular structure of component (A). That is why not less than 5 mole %, preferably more than 10 mole %, of all silicon-bonded univalent groups should be aromatic hydrocarbon groups. If the above groups are in an amount of less than 5 mole %, this will impair transparency of a cured body and will not allow one to obtain desired physical properties and resistance to heat. The aforementioned univalent aromatic hydrocarbon groups can be exemplified by a phenyl group, tolyl group, and xylyl group, of which phenyl group is preferable. The aromatic hydrocarbon group may be a bivalent aromatic hydrocarbon group, e.g., a phenylene group. Organic groups other than the univalent aromatic hydrocarbon group comprise preferably alkyl groups, and more preferably methyl groups.

The following are specific examples of component (B): diphenyl silane, 1,3-bis (dimethylsilyl)benzene, 1,4-bis(dimethylsilyl)benzene, or a similar silylated hydrocarbon or an organosilane having two silicon-bonded hydrogen atoms; organosiloxane oligomers represented by the following formulas: $(HMePhSi)_2O$, $(HMe_2SiO)_2SiPh_2$, $(HMePhSiO)_2SiPh_2$, $(HMe_2SiO)_2SiMePh$, $(HMe_2SiO)(SiPh_2)_2(OSiMe_2H)$, $(HMe_2SiO)_3SiPh$ or $(HMePhSiO)_3SiPh$; organopolysiloxane resins composed of $(PhSiO_{3/2})$ and $(Me_2HSiO_{1/2})$ units; organopolysiloxane resins composed of $(PhSiO_{3/2})$, $(Me_2SiO_{2/2})$, and $(Me_2HSiO_{1/2})$ units; organopolysiloxane resins composed of $(PhSiO_{3/2})$, $(MeSiO_{3/2})$, and $(MeHSiO_{1/2})$ units; organopolysiloxane resins composed of $(PhSiO_{3/2})$ and $(MeHSiO_{2/2})$ units; organopolysiloxane resins composed of $(Me_2HSiO_{1/2})$, $(MePh_2SiO_{1/2})$, and $(SiO_{4/2})$ units;
linear-chain organopolysiloxane composed of $(MePhSiO_{2/2})$ and $(Me_2HSiO_{1/2})$ units; linear-chain organopolysiloxanes composed of $(Me_2SiO_{2/2})$, $(MePhSiO_{2/2})$, and $(Me_2HSiO_{1/2})$ units; linear-chain organopolysiloxanes composed of $(MePhSiO_{2/2})$, $(MeHSiO_{2/2})$, and $(Me_3SiO_{1/2})$ units; linear-chain organopolysiloxanes composed of $(MePhSiO_{2/2})$, $(MeHSiO_{2/2})$, and $(Me_2HSiO_{1/2})$ units; linear-chain organopolysiloxanes composed of $(PhHSiO_{2/2})$ and $(Me_3SiO_{1/2})$ units; linear-chain organopolysiloxanes composed of $(MeHSiO_{2/2})$ and $(MePh_2SiO_{1/2})$ units; and cyclic organopolysiloxanes composed of $(PhHSiO_{2/2})$ units. These organic silicon compounds can be used in combination of two or more.

The compounds can be produced by methods known in the art. For example, they can be produced by hydrolysis and condensation only of an organochlorosilane having silicon-bonded hydrogen atom, or by co-hydrolysis and condensation of an organochlorosilane having silicon-bonded hydrogen atom with an organochlorosilane having no silicon-bonded hydrogen atom.

Since minimization of the number of unsaturated aliphatic hydrocarbon groups remaining after cross-linking of components (A) and (B) improves light transmittance, UV-resistant and oxygen-resistant properties of the cured film, it is recommended to combine components (A) and (B) so that the molar ratio of silicon-bonded hydrogen atoms of component (B) to unsaturated aliphatic hydrocarbon groups of component (A) provides some excess of the aforementioned hydrogen atoms. More specifically, it is recommended to have a mole ratio of silicon-bonded hydrogen atoms of component (B) to alkenyl groups of component (A) in the range of 1.0 to 1.3.

A hydrosilylation catalyst of component (C) may comprise a metal of group VIII of the periodic table or a compound of said metal, of which platinum or platinum compounds are preferable. Such a catalyst may be exemplified by a fine platinum powder, chloroplatinic acid, platinum-diolefin complex, platinum-diketone complex, platinum-divinyltetramethyldisiloxane complex, or a platinum-phosphine complex. In terms of weight of metal, the catalyst can be used in an amount of 0.05 ppm to 300 ppm, preferably 0.1 ppm to 50 ppm, per total weight of components (A) and (B). If the catalyst is used in an amount less than the lower recommended limit, it will be impossible to catalyze the cross-linking reaction to a desired degree, and if the catalyst is used in an amount exceeding the upper recommended limit, the residual metal will impair optical properties of the film.

In order to inhibit the hydrosilylation reaction and cross-linking reaction at room temperature and to extend the pot life, in addition to aforementioned components (A), (B), and (C), the composition may contain a hydrosilylation reaction retarder. Specific examples of such a retarder are the following: 2-methyl-3-butyn-2-ol, dimethyl maleate, diethyl fumarate, bis(2-methoxy-1-methylethyl)maleate, ethynyl-1-cyclohexanol, 3,5-dimethyl-1-hexyn-3-ol, N,N,N',N'-tetramethylethylene diamine, ethylene diamine, diphenyl phosphine, diphenyl phosphate, trioctyl phosphine, and methyldiphenyl phosphinite. The aforementioned hydrosilylation reaction retarder should be added in a weight ratio of 1 to 10000 to the weight of the hydrosilylation catalyst.

In order to impart some other desired characteristics to free-standing films comprising a cured organopolysiloxane resin, in addition to the aforementioned indispensable components, the curable organopolysiloxane composition is normally combined with various additives. For example, when there are no strict requirements for optical transparency of free-standing film comprising a cured organopolysiloxane resin, the composition may incorporate silica, which is normally used as a conventional filler (e.g., fumed silica or colloidal silica), alumina, or a similar fine inorganic powder. Such additives can increase the strength of the free-standing film comprising a cured organopolysiloxane resin. The amount of inorganic powder to be added varies, depending on the application, and can be easily determined experimentally.

Even with the addition of inorganic powder, the film may still acquire proper transparency by adjusting the size of the particles. Non-transparency, or opacity, of the film occurs because the added particles scatter the light, and this scattering condition will be different depending on the refractive index of the material from which the particles are made, but, in general, in order for the film to maintain transparency, the scattering of light can be suppressed if the particle size does not exceed ⅕ to ⅙ of the incident light wavelength (which for the visible-light wavelength range corresponds to 80 to 60 nm). Another significant source of light scattering is secondary aggregation of the particles, and in order to suppress secondary aggregation, the particles may be subjected to surface treatment.

The cross-linkable organopolysiloxane resin composition used for the manufacture of the free-standing film comprising a cured organopolysiloxane resin may also contain a phthalothianine pigment, as well as conventional fluororesin substances or similar dyes or pigments. Furthermore, since the free-standing film comprising a cured organopolysiloxane resin does not have a specific absorption band in the visible wavelength range, the composition may also be combined with additives that absorb the visible light and demonstrate a specific function resulting from excitation of light.

A process for manufacturing a film comprising a cured organopolysiloxane resin of the present invention comprises the steps of:
coating a cross-linkable organopolysiloxane resin composition comprising:
(A) an organopolysiloxane resin represented by the following average siloxane unit formula:

  (1) or

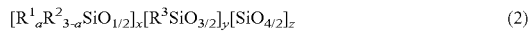  (2)

(where $R^1$ designates univalent hydrocarbon groups of one or more than one type selected from alkyl groups having 1 to 4 carbon atoms and univalent aromatic hydrocarbon groups having 6 to 8 carbon atoms; $R^2$ designates alkenyl groups having 2 to 6 carbon atoms; $R^3$ designates univalent hydrocarbon groups of one or more than one type selected from alkyl groups with 1 to 4 carbon atoms and univalent aromatic hydrocarbon groups having 6 to 8 carbon atoms; at least 50 mole % of $R^3$ groups being phenyl groups; "a" is 0, 1, or 2; $0.8 \leq w < 1.0$ and $v+w=1$; $0 < x < 0.4$, $0.5 < y < 1$, $0 < z < 0.4$, and $x+y+z=1$);

(B) an organosilicon compound that contains in one molecule two or more silicon-bonded hydrogen atoms, in which not less than 5 mole % of all silicon-bonded univalent groups are univalent aromatic hydrocarbon groups, and (C) a hydrosilylation catalyst; onto a substrate to form an uncured film; forming a cured film by cross-linking the aforementioned uncured film; and peeling the obtained cured film off from the substrate.

Components (A), (B), and (C) have been defined above. A hydrosilylation reaction, gel formation, and subsequent curing may occur if these components are mixed even at room temperature. Therefore, the composition may contain the above-described hydrosilylation retardants. When components (A) and (B) are not liquid or are highly viscous at normal temperature, they can be dissolved in appropriate organic solvents. Since cross-linking reaction temperature can be as high as about 200° C., the boiling temperature of the aforementioned solvents can be as high as 200° C. There are no special restrictions with regard to the above-mentioned solvents, provided that they can dissolve components (A) and (B) and that they do not interfere with the hydrosilylation reaction. The appropriate organic solvents are exemplified by the following: acetone, methylisobutylketone, or similar ketones; toluene, xylene, or similar aromatic hydrocarbons; heptane, hexane, octane, or similar aliphatic hydrocarbons; dichloromethane, chloroform, methylene chloride, 1,1,1-trichloroethane, or similar halogenated hydrocarbons; THF or similar ethers; dimethylformamide and N-methylpyrrolidone. There are no special restrictions with regard to the amounts in which the organic solvents can be added; however, it may be recommended to add them in an amount of 1 to 300 parts by mass per 100 parts by mass of the sum of components (A), (B), and (C).

An uncured film is prepared by spreading a mixture of components (A), (B), and (C), a mixture of components (A), (B), and (C) with a hydrosilylation retardant, or an organic solvent solution of the aforementioned mixtures onto the surface of a substrate. From the point of view of good spreadability, viscosity of the appropriate mixture should not exceed $1 \times 10^3$ Pa·s and preferably should not exceed $1 \times 10^2$ Pa·s.

There are no special restrictions with regard to the substrates that can be used for the above purposes, provided that the substrate has a smooth surface and allows separation of the cured organopolysiloxane resin film by peeling. However, the substrate should demonstrate stability with regard to components (A), (B), and (C), the hydrosilylation retardant, and the organic solvent and should withstand the temperature of the environment in which cross-linking of the uncured film is to be carried out. Preferable substrates can be made from glass, quartz, ceramic, graphite, or similar inorganic materials; stainless steel, alumite, duralumin, or a similar metal material; polymer materials such as polytetrafluoroethylene and polyethyleneterephthalate, which are insoluble in organic solvents and stable even at boiling temperatures of the organic solvents.

Cross-linking (curing) of the uncured film can be carried out by holding it in quiescence at room temperature or by heating it to a temperature higher than room temperature. If the uncured film contains an organic solvent, it is recommended to remove the organic solvent through evaporation by drying it with airflow or at room temperature or at a temperature slightly higher than room temperature. The temperature required for cross-linking (curing) may be in the range of 40 to 200° C. If necessary, the heating method may be adjusted in accordance with specific conditions. For example, heating may consist of multiple cycles of short duration or of a prolonged continuous cycle.

A free-standing film comprising a cured organopolysiloxane resin is obtained by peeling the cured organopolysiloxane resin layer from the substrate. Peeling can be carried out by means known in the art, e.g., with the use of a doctor blade, vacuum suction, or other mechanical peeling means. The thickness of the free-standing film comprising the cured organopolysiloxane can vary depending on the specific purpose of the film, but, typically, the thickness should range from 5 to 300 μm. Sheets having a thickness that exceeds this range also can be formed.

The term "free-standing film" of the present invention comprising a cured organopolysiloxane resin by the above-described method also covers various free-standing films obtained by cast molding normally used for molding thermosetting resins. The free-standing film of the present invention comprising a cured organopolysiloxane is characterized by the fact that it does not have a specific absorption band in the visible-light wavelength range. At a wavelength of 400 nm, the film has a light transmittance exceeding 85%, and in the wavelength range of 500 to 700 nm, the light transmittance exceeds 88%. Since the free-standing film of the present invention comprising a cured organopolysiloxane resin can be produced without application of stress to the resin in the molten state, the film manufacturing process does not encounter the problem of polymer-chain orientation. Therefore, a phenomenon such as birefringence is low and can be neglected.

The free-standing film of the present invention comprising a cured organopolysiloxane resin is obtained by causing cross-linking as a result of a hydrosilylation reaction between the unsaturated aliphatic hydrocarbon groups of component (A) and silicon-bonded hydrogen atoms of component (B). Since in the course of cross-linking such a reaction does not generate byproducts of low molecular weight, the reaction product is characterized by a smaller degree of shrinking as compared to shrinking of conventional thermosetting resins in a mold, whereby it becomes possible to restrict volumetric shrinking of the film during cross-linking. Therefore, the free-standing film that comprises an organopolysiloxane resin cured by hydrosilylation reaction can be produced with reduced internal stress. Another advantage is improvement in optical uniformity and mechanical strength of the film. Furthermore, the free-standing film of the present invention comprising a cured organopolysiloxane resin retains its shape as a film and does not change its weight at temperatures up to 300° C. Mechanical properties of the film remain excellent even after heating and are almost the same as prior to heating. Therefore, the free-standing film of the present invention possesses almost the same heat-resistant properties as polycarbonate or similar conventional engineering plastics and can be used in fields that require resistance to heat.

The layered film of the present invention comprises the aforementioned free-standing film comprising a cured organopolysiloxane resin coated with a layer of an inorganic material. Normally, a substrate for the layered film of the present invention may be comprising a single-layered or multi-layered free-standing film or, if necessary, of another transparent film or sheet onto which the free-standing film comprising a cured organopolysiloxane resin is laminated.

Since the free-standing film of the present invention comprising a cured organopolysiloxane resin possesses heat-resistant properties and low hygroscopicity and since it is a cured body, the film can be used without problems in vacuum film-forming processes (deposition processes) without evaporation of low molecular weight components from the film. For these reasons the film of the present invention is suitable for forming an inorganic material layer on its surface by various methods such as a vacuum film-forming (deposition) method. More specifically, a layered film composed of an inorganic deposited layer on a free-standing film comprising a cured organopolysiloxane resin without a specific absorption band in the wavelength range of 400 nm to 800 nm can be produced by vacuum deposition at temperatures that do not exceed 300° C. Such a condition is required in order to prevent deformation and thermal decomposition of the free-standing film comprising a cured organopolysiloxane resin. Preferably, during the aforementioned vacuum film-forming process (deposition process), the temperature should not exceed 250° C.

There are no limitations with regard to the material of the inorganic layer provided that it can be applied by a deposition method. Examples of such materials are the following: $SiO_2$, ZnO, $In_2O_3$, $SnO_2$, ITO (Indium Tin Oxide; $In_2O_{3-x}Sn$), NiO, FeO, $Cu_2O$, alumina, silicon nitride, oxidized silicon nitride, tungsten, gold, silver, copper, aluminum, diamond, etc. The thickness of the inorganic layer depends on the type of the material, but, in general, the appropriate range should be set between 50 and 5000 Å. If the inorganic film thickness is too thin, e.g., in the range of 50 to 100 Å for metals such as silver that possess a certain absorption band for visible light, it can be used to form a transparent conductive layer of an inorganic material and thus to impart to the obtained layered film the function of a transparent electrode. The aforementioned material for transparent electrodes may comprise a material that possesses high transparency in the visible wavelength range and can be selected from metal-oxide-type semiconductor substances that have a certain band gap absorption in the short wavelength range, which is below 400 nm. Such a material is exemplified by $SiO_2$, ZnO, $In_2O_3$, $SnO_2$, ITO, or similar metal-oxide-type semiconductors.

The vacuum-forming methods that can be used to form the aforementioned layered film are exemplified by thermal CVD, plasma CVD, catalytic CVD, MOCVD, or similar methods that use gas as a film-forming source, as well as deposition methods such as DC or RF sputtering and ion plating in which a target is used as the source of a film-forming material.

When a film of an inorganic material is formed on a conventional organic polymer film as a substrate, the use of film-forming processes such as those that activate oxygen contained in the film-forming chamber and turns in into high-energy oxygen under the effect of plasma is undesirable. This is because the aforementioned oxygen can easily cause oxidation and decomposition of the organic compounds of the film. Generally, introduction of oxygen into the film-forming chamber is needed for the formation of a layer of an inorganic material, e.g., for the formation of an inorganic layer as a metal-oxide-type semiconductor. Typically, metal-oxide-type semiconductors are n-type semiconductors of $In_2O_3$, $SnO_2$, ITO ($In_2O_{3-x}Sn$), $SnO_2$, or ZnO, or p-type semiconductors of NiO, FeO, $Cu_2O$, etc. Normally, during the formation of the aforementioned inorganic-material layer, the vacuum chamber is evacuated, then argon under a pressure of $10^{-4}$ Torr and oxygen under a pressure of $10^{-5}$ Torr are introduced, oxygen deficiency in the ITO or similar metal-oxide semiconductor is compensated, and increase of resistance caused by decrease in carrier concentration is prevented. Resistance of the inorganic-material layer is adjusted by doping. For example, when ZnO is selected as a conductive substance, it is doped with In or Al, or the like. Similarly, the layer of $SnO_2$ is doped with Sb, F, or the like. Normally, such methods make it possible to obtain resistance in the range of $1\times10^{-5}$ to $1\times10^{-2}$ Ohm/cm. Since the free-standing film of the present invention comprising a cured organopolysiloxane resin is highly resistant to oxygen, it is suitable for use in aforementioned film-forming and doping processes and allows application of an inorganic-material layer on its surface.

Furthermore, since a cured organopolysiloxane resin has low surface tension and, therefore, poor adhesion, when it is necessary to improve adhesion between the inorganic-material layer and the free-standing film comprising a cured organopolysiloxane resin, it is recommended to use an ion-plating method. According to this method, molecules contained in a gaseous phase are accelerated by ions, collide at high kinetic energy with the surface of the film and strongly adhere to the film. In contrast to a layered film on which the inorganic-material layer is formed by conventional RF sputtering, the film produced by the aforementioned ion-plating method do not show a noticeable difference in the properties after dipping into boiling water or after heating to a temperature close to 300° C.

When an inorganic-material layer is formed on a substrate, crystallization of this layer can be accelerated by annealing, and since the free-standing film of the present invention comprising a cured organopolysiloxane resin does not develop any physical changes with heating up to 300° C., the film can be annealed at temperatures around 300° C. Therefore, when it is necessary to form an inorganic layer by sputtering a metal onto a film substrate, a thin layer can be formed at temperatures not exceeding 300° C. from noble metals of many types including gold, silver, copper, or other metals.

A CVD process that forms an inorganic-material layer on a free-standing film comprising a cured organopolysiloxane resin by decomposition of gas introduced into the deposition chamber, does not encounter any problems so long as it is conducted at a low-temperature (200 to 250° C.) such as plasma CVD For example, an a-Si (H) film can be formed without problems at 200 to 250° C. in the process for the formation of such a film under the following conditions: the inner pressure for argon or hydrogen in the deposition chamber in the range of 0.1 to 1 Torr and for gaseous silanes such as $SiH_4$ and $Si_2H_6$, etc., in the range of 0.01 to 0.1 Torr; RF power in the range of 10 to 100 mW/cm². Since the polysiloxane can withstand the aforementioned temperature, which is one of the environmental conditions of the film-forming process, and since the polysiloxane is not affected by substances present in the aforementioned environment, no obstacles exist for using the polysiloxane in vacuum film-forming processes.

Because the free-standing film of the present invention comprising a cured organopolysiloxane resin is not affected by oxygen used in vacuum film-forming processes, the aforementioned film is suitable for coating it by the CVD method with a thin layer of silica by using an oxygen-containing compound, e.g., a tetraethoxysilane. Formation of such a layer decreases permeation of gas and improves resistance to abrasive wear and scratching.

EXAMPLES

The present invention will be further described more specifically with reference to practical examples and comparative examples. It should be understood that the aforementioned examples do not limit the scope of application of the present invention. Molecular weight of polysiloxane resins in the synthesis examples was measured by GPC [HCL-8020 (made by Tosoh Corporation)] equipped with two TSKgel/$GMH_{XL}$-L columns (made by Tosoh Corporation). Chloroform was used as a solvent. The results of measurement were recalculated with reference to polystyrene. Average unit formulas of polysiloxane resins were determined by $^{29}$Si NMR spectral analysis made with the use of an ACP-300 spectrometer of Bruker Instruments Co., Inc.

Synthesis Example 1

A four-neck flask equipped with a reflux condenser, dropping funnel, and a stirrer was filled with 450 ml of water, and then 210 ml of toluene, 109 g of phenyl-trichlorosilane, and 11.0 g of vinyldimethylchlorosilane were slowly added dropwise over 30 min. at room temperature under stirring conditions. After further 30 min. of stirring at room temperature, the toluene layer was washed with water to neutral. The toluene layer was then transferred to a one-neck flask, and the toluene was removed by distillation until the concentration of solids reached 50 wt. %. Following this, 82 mg of potassium hydroxide was added, and while water was removed by azeotropic distillation, refluxing was carried out for 16 hours. On completion of the reaction, the potassium hydroxide was neutralized by a small amount of vinyldimethylchlorosilane. Neutrality of the toluene layer was checked by washing with water, and the toluene layer was dried by using a drying agent. After removal of the drying agent, toluene was removed under reduced pressure, whereby 69.5 g of a methylphenylvinylpolysiloxane resin was obtained in the form of a white solid substance. Measurements showed that the obtained methylphenylvinylpolysiloxane resin had a weight-average molecular weight of 1700 and a number-average molecular weight of 1400. $^{29}$Si NMR spectral analysis showed that the obtained resin had the following average siloxane unit formula: $[ViMe_2SiO_{1/2}]_{0.14}[PhSiO_{3/2}]_{0.86}$.

Synthesis Example 2

A four-neck flask equipped with a reflux condenser, dropping funnel, and a stirrer was filled with 410 ml of water, and then 410 ml of toluene, 202 g of phenyl-trichlorosilane, 22.9 g of vinyldimethylchlorosilane, and 13.3 g of tetraethoxysilane were slowly added dropwise over 35 min. at room temperature under stirring conditions. After 30 min. of stirring at room temperature, the toluene layer was washed with water to neutral. The toluene layer was then transferred to a one-neck flask, and the toluene was removed by distillation until the concentration of solids reached 50 wt. %. Following this, 170 mg of potassium hydroxide was added, and while water was removed by azeotropic distillation, refluxing was carried out for 16 hours. On completion of the reaction, potassium hydroxide was neutralized by a small amount of vinyldimethylchlorosilane. Neutrality of the toluene layer was checked by washing with water, and the toluene layer was dried by using a drying agent. After removal of the drying agent, toluene was removed under reduced pressure, whereby 141 g of a methylphenylvinylpolysiloxane resin was obtained in the form of a white solid substance. Measurements showed that the obtained methylphenylvinylpolysiloxane resin had a weight-average molecular weight of 1900 and the number-average molecular weight of 1400. $^{29}$Si NMR spectral analysis showed that the obtained resin had the following average siloxane unit formula:

$[ViMe_2SiO_{1/2}]_{0.15}[PhSiO_{3/2}]_{0.80}[SiO_{4/2}]_{0.05}$.

Synthesis Example 3

A four-neck flask equipped with a reflux condenser, dropping funnel, and a stirrer was filled with 320 ml of water, and then 340 ml of toluene, 157 g of phenyl-trichlorosilane, 20.0 g of vinyldimethylchlorosilane, and 20.6 g of tetraethoxysilane were slowly added dropwise over 45 min. at room temperature under stirring conditions. After 30 min. of stirring at room temperature, the toluene layer was washed with water to neutral. The toluene layer was then transferred to a one-neck flask, and the toluene was removed by distillation until the concentration of solids reached 50 wt. %. Following this, 130 mg of potassium hydroxide were added, and while water was removed by azeotropic distillation, refluxing was carried out for 16 hours. On completion of the reaction, potassium hydroxide was neutralized by a small amount of vinyldimethylchlorosilane. Neutrality of the toluene layer was checked by washing with water, and the toluene layer was dried by using a drying agent. After removal of the drying agent, toluene was removed under reduced pressure, whereby 108 g of methylphenylvinylpolysiloxane resin were obtained in the form of a white solid substance. Measurements showed that the obtained methylphenylvinylpolysiloxane resin had a weight-average molecular weight of 2300 and the number-average molecular weight of 1800. $^{29}$Si NMR spectral analysis showed that the obtained resin had the following average siloxane unit formula:

$[ViMe_2SiO_{1/2}]_{0.15}[PhSiO_{3/2}]_{0.76}[SiO_{4/2}]_{0.09}$.

Synthesis Example 4

A four-neck flask equipped with a reflux condenser, dropping funnel, and a stirrer was filled with 64 ml of water, 18.8 g of 1,3-divinyl-1,1,3,3-tetramethyldisiloxane, and 0.066 g of trifluoromethanesulfonic acid. The mixture was then combined with 200 g of phenyltrimethoxysilane and 28.1 g of tetraethoxysilane, which were added dropwise, and a reaction was carried out for 90 min. at 69° C. After the alcohol was removed by evaporation, 69 g of toluene were added, and water was removed by azeotropic distillation. Following this, the contents were combined with 1.93 g of a 20 wt. % aqueous solution of potassium hydroxide, and while water was removed by azeotropic distillation, refluxing was carried out for 16 hours. On completion of the reaction and after neutralization of potassium hydroxide with a small amount of vinyldimethylchlorosilane, neutrality of the toluene layer was checked by washing with water, and the toluene layer was dried by using a drying agent. After removal of the drying agent, the solvent was removed by distillation at a reduced pressure, whereby 139 g of methylphenylvinylpolysiloxane resin were obtained in the form of a white solid substance. Measurements showed that the obtained methylphenylvinylpolysiloxane resin had a weight-average molecular weight of 3200 and the number-average molecular weight of 1800. $^{29}$Si NMR spectral analysis showed that the obtained resin had the following average siloxane unit formula:

$[ViMe_2SiO_{1/2}]_{0.11}[PhSiO_{3/2}]_{0.79}[SiO_{4/2}]_{0.10}.$

Synthesis Example 5

A reactor was filled with 78 g of 1,1,3,3-tetramethyldisiloxane, 95 g of hexamethyldisiloxane, 48 g of ethanol, 59 g of water, and 33 ml of a 35% concentrated hydrochloric acid, and the components were stirred with cooling at −10° C. Under stirring conditions the contents were combined with 270 g of tetraethoxysilane added dropwise, and after the reaction was completed, hexane extraction was carried out. The extract was washed to neutral with a saturated aqueous solution of ammonium chloride, and then the product was dried with sodium sulfate. Hexane was removed by means of an aspirator, and the product was dried under vacuum to produce a colorless polymer. The yield was 84%. GPC, NMR, and titration of silicon-bonded hydroxyl groups showed that the obtained polymer comprised a methylhydrogenpolysiloxane resin represented by the following average siloxane unit formula:

$[HMe_2SiO_{1/2}]_{0.9}[Me_3SiO_{1/2}]_{0.9}[SiO_{4/2}].$

Synthesis Example 6

A reactor was filled with 50 g of 1,3-divinyl-1,1,3,3-tetramethyldisiloxane, 44 g of hexamethyldisiloxane, 22 g of ethanol, 31 g of water, and 16 ml of a 35% concentrated hydrochloric acid, and the components were stirred for 30 min. at a temperature in the range of 40 to 50° C. Under stirring conditions the contents were combined with 125 g of tetraethoxysilane added dropwise, and after the reaction was completed, hexane extraction was carried out. The extract was washed until neutrality with a saturated aqueous solution of sodium chloride, and then the product was dried with magnesium sulfate. Hexane was removed by means of an aspirator, and the product was dried under vacuum to produce a colorless polymer. The yield was 92%. GPC, NMR, and titration of silicon-bonded hydroxyl groups showed that the obtained polymer comprised a methylvinylpolysiloxane resin represented by the following average siloxane unit formula:
$[ViMe_2SiO_{1/2}]_{0.9}[Me_3SiO_{1/2}]_{0.9}[SiO_{4/2}].$ Practical Example 1

A 75 wt. % toluene solution of the methylphenylvinylpolysiloxane resin of Synthesis Example 1 was combined with 1,4-bis(dimethylsilyl)benzene in a 1.1 mole ratio of silicon-bonded hydrogen atoms of the latter to vinyl groups of the former, and the components were thoroughly mixed. Following this, a 1,3-divinyl-1,1,3,3-tetramethyldisiloxane solution of a complex of platinum with 1,3-divinyl-1,1,3,3-tetramethyldisiloxane (5 wt. % content of metallic platinum) was added to the aforementioned mixture of 1,4-bis(dimethylsilyl)benzene with the aforementioned polysiloxane in an amount of 2 ppm of metallic platinum (in terms of mass units) per mass of solids of the aforementioned mixture. The product was continuously stirred to produce a casting solution. The obtained casting solution was spread over a glass substrate and held in quiescence at room temperature for 1 hour and then was cured, first by holding it for 2 hours at 100° C. and then for 3 hours at 150° C. The cured product was cooled until it reached room temperature, and the cured methylphenylvinylpolysiloxane resin was peeled from the glass substrate, whereby a free-standing film consisting of the cured methylphenylvinylpolysiloxane resin was obtained.

The film was transparent and had a thickness of 100 µm. Light transmittance of the film measured by means of a SHIMADZU Spectrophotometer (Model 3100 PC) showed in the wavelength range of 400 nm to 700 nm a value higher than 85%. Although light transmittance of the film was measured with the use of a polarization element, the polarization light did not show any effect on the results of measurement. Furthermore, the film did not show any birefringence. A 1.5 mm-thick cured methylphenylvinylpolysiloxane resin was produced under the same curing conditions as stated above, and the glass-transition temperature of 111° C. was determined from tan δ by measuring dynamic viscoelasticity with the use of a dynamic viscoelastic spectrometer (RDA-II manufactured by Rheometrix Company, Inc.). Furthermore, a cured methylphenylvinylpolysiloxane resin having a 5-mm width, 5-mm length, and 15-mm height was produced under the same curing conditions as described above, and then a coefficient of thermal expansion was measured under compression mode by using a multithermal analysis system of ULVAC Company. The results showed that at 100° C. the thermal expansion coefficient was equal to 152 ppm/K. The flexural strength of the cured methylphenylvinylpolysiloxane resin was measured on a plate having a width of 1.27 cm, a length of 5.08 cm, and a thickness of 0.25 cm by means of an Autograph of SHIMADZU CORPORATION. Young's modulus was equal to 1.5 GPa, and the flexural strength was 56 MPa.

Practical Example 2

A free-standing film consisting of a cured methylphenylvinylpolysiloxane resin was produced by the same method as in Practical Example 1 with the use of a 75 wt. % toluene solution of the methylphenyvinylpolysiloxane resin obtained in Synthesis Example 2 and 1,4-bis(dimethylsilyl)benzene. Light transmittance of the film measured by means of a SHIMADZU Spectrophotometer (Model 3100 PC) showed in the wavelength range of 400 nm to 700 nm a value higher than 85%. Although light transmittance of the film was measured with the use of a polarization element, the polarization light did not show any effect on the results of measurement. Furthermore, the film did not show any birefringence. The glass-transition temperature of 140° C. was determined from tan δ by measuring dynamic viscoelasticity by the same method as in Practical Example 1. The thermal expansion coefficient at 100° C. was equal to 127 ppm/K. Young's modulus was equal to 1.3 GPa, and the flexural strength was 48 MPa.

Practical Example 3

A free-standing film consisting of a cured methylphenylvinylpolysiloxane resin was produced by the same method as in Practical Example 1 with the use of a 75 wt. % toluene solution of the methylphenylvinylpolysiloxane resin obtained in Synthesis Example 3 and 1,4-bis(dimethylsilyl)benzene. Light transmittance of the film measured by means of SHIMADZU Spectrophotometer (Model 3100 PC) showed in the wavelength range of 400 nm to 700 nm a value higher than 85%. Although light transmittance of the film was measured with the use of a polarization element, the polarization light did not show any effect on the results of measurement. Furthermore, the film did not show any birefringence. The glass-transition point temperature of 226° C. was determined from tan δ by measuring dynamic viscoelasticity by the same method as in Practical Example 1. The thermal expansion coefficient at 100° C. was equal to 138 ppm/K. Young's modulus was equal to 1.4 GPa, and the flexural strength was 50 MPa.

Practical Example 4

A free-standing film consisting of a cured methylphenylvinylpolysiloxane resin was produced by the same method as in Practical Example 1 with the use of a 75 wt. % toluene solution of the methylphenyvinylpolysiloxane resin obtained in Synthesis Example 3 and a disiloxane of formula (HMePhSi)$_2$O. Light transmittance of the film measured by means of SHIMADZU Spectrophotometer (Model 3100 PC) showed in the wavelength range of 400 nm to 700 nm a value higher than 85%. Although light transmittance of the film was measured with the use of a polarization element, the polarization light did not show any effect on the results of measurement. Furthermore, the film did not show any birefringence. The glass-transition temperature of 323° C. was determined from tan δ by measuring dynamic viscoelasticity by the same method as in Practical Example 1. The thermal expansion coefficient at 100° C. was equal to 190 ppm/K. Young's modulus was equal to 1.3 GPa, and the flexural strength was 43 MPa.

Practical Example 5

A free-standing film consisting of a cured methylphenylvinylpolysiloxane resin was produced by the same method as in Practical Example 1 with the use of a 75 wt. % toluene solution of the methylphenyvinylpolysiloxane resin obtained in Synthesis Example 4 and 1,4-bis-(dimethylsilyl)benzene. Light transmittance of the film measured by means of SHIMADZU Spectrophotometer (Model 3100 PC) showed in the wavelength range of 400 nm to 700 nm a value higher than 85%. Although light transmittance of the film was measured with the use of a polarization element, the polarization light did not show any effect on the results of measurement. Furthermore, the film did not show any birefringence. The glass-transition temperature of 221° C. was determined from tan δ by measuring dynamic viscoelasticity by the same method as in Practical Example 1. The thermal expansion coefficient at 100° C. was equal to 142 ppm/K. Young's modulus was equal to 1.1 GPa, and the flexural strength was 39 MPa.

Comparative Example 1

A free-standing film consisting of a cured methylphenylvinylpolysiloxane resin was produced by the same method as in Practical Example 1 by using a 75 wt. % toluene solution of methylphenyvinylpolysiloxane resin represented by an average siloxane unit formula [ViMe$_2$SiO$_{1/2}$]$_{0.25}$[PhSiO$_{3/2}$]$_{0.75}$ and having a weight average molecular weight of 1700 determined by GPC and 1,4-bis-(dimethylsilyl)benzene. Light transmittance of the film measured by means of SHIMADZU Spectrophotometer (Model 3100 PC) showed in the wavelength range of 400 nm to 700 nm a value higher than 85%. Although light transmittance of the film was measured with the use of a polarization element, the polarization light did not show any effect on the results of measurement. Furthermore, the film did not show any birefringence. Young's modulus and flexural strength were measured by the same method as described in Practical Example 1 and showed values of 1.5 GPa and 47 MPa, respectively; however, the glass-transition temperature determined from tan δ by measuring viscoelasticity was equal to 82° C. and the thermal expansion coefficient at 100° C. was 250 ppm/K.

Comparative Example 2

A free-standing film consisting of a cured methylphenylvinylpolysiloxane resin was produced by the same method as in Practical Example 1 by using the same methylphenyvinylpolysiloxane resin as the one used in Comparative Example 1 and a disiloxane of formula (HMePhSi)$_2$O. Light transmittance of the film measured by means of SHIMADZU Spectrophotometer (Model 3100 PC) showed in the wavelength range of 400 nm to 700 nm a value higher than 85%. Although light transmittance of the film was measured with the use of a polarization element, the polarization light did not show any effect on the results of measurement. Furthermore, the film did not show any birefringence. Young's modulus and flexural strength were measured by the same method as described in Practical Example 1 and showed values of 1.5 GPa and 44 MPa, respectively; however, the glass-transition temperature determined from tan δ by measuring viscoelasticity was equal to 69° C.

Comparative Example 3

A free-standing film consisting of a cured methylphenylvinylpolysiloxane resin was produced by the same method as in Practical Example 1 by using the same methylphenyvinylpolysiloxane resin as the one used in Comparative Example 1 and a methylphenylsiloxane of formula (HMe$_2$ SiO)$_2$SiPh$_2$. Light transmittance of the film measured by means of SHIMADZU Spectrophotometer (Model 3100 PC) showed in the wavelength range of 400 nm to 700 nm a value higher than 85%. Although light transmittance of the film was measured with the use of a polarization element, the polarization light did not show any effect on the results of measurement. Furthermore, the film did not show any birefringence. Young's modulus, flexural strength, and glass-transition temperature determined from tan δ by measuring dynamic viscoelasticity were equal to 0.6 GPa, 17 MPa, and 60° C., respectively.

Comparative Example 4

A free-standing film consisting of a cured methylvinylpolysiloxane resin was produced by the same method as in Practical Example 1 by using a methylvinylpolysiloxane resin of the average siloxane unit formula [ViMe$_2$SiO$_{1/2}$]$_{0.12}$[MeSiO$_{3/2}$]$_{0.88}$ and having a weight average molecular weight of 2700 determined by GPC and 1,3,5,7-tetramethylcyclotetrasiloxane. Young's modulus was 1.1 GPa; however, the glass-transition temperature determined from tan δ by measuring viscoelasticity was equal to 130° C., while the thermal expansion coefficient at 100° C. was 210 ppm/K.

Comparative Example 5

A free-standing film consisting of a transparent cured methylvinylpolysiloxane resin of the same type as in Practical Example 1 was produced by using the methylhydrogenpolysiloxane resin obtained in Synthesis Example 5 and the methylvinylpolysiloxane obtained in Synthesis Example 6. The glass-transition temperature determined from tan δ by measuring viscoelasticity was equal to 100° C., and the thermal expansion coefficient at 100° C. was 250 ppm/K.

Practical Example 6

A transparent layered film was produced in a film-forming chamber by depositing a transparent ITO layer on a 100 μm-thick free-standing film obtained in Practical Example 3. More specifically, the layer was applied by using an ITO target by an RF sputtering process. After the chamber was evacuated, the concentration of oxygen was adjusted to correspond to a pressure of $2 \times 10^{-4}$ Torr. The RF power was set to 500 W. An ITO layer was formed by maintaining the film at 60° C. The thickness of the layer can be adjusted by changing the time during which the inorganic-material layer is formed. Four types of such transparent layered films were formed, and resistance of the ITO layers was measured and the respective absorption spectra (measured by SHIMADZU Spectrophotometer, Model 3100 PC), were determined for all four types of transparent layered films. Measurement results are shown in FIG. 1. The absorption spectra were measured for the second time by the same instrument, but after 2 hours of heating at 150° C. However, no changes were observed in the spectral characteristics.

The obtained layered films were immersed for 2 hours in boiling water, but this did not cause peeling of the inorganic-material layers. The appearance and absorption spectra of the layered films changed slightly after the films were heated for 16 hours at 200° C. Immersion of the transparent layered film with an ITO layer into 6N nitric acid caused removal of the ITO layer and exposed a transparent layer of the cured methylvinylpolysiloxane resin. However, within the scope of measurements produced by an infrared spectrometer no changes were observed in the infrared spectral bands of the transparent film. Tensile strength did not change as well. These observations show that after the ITO-layer formation process the film comprising a cured methylvinylpolysiloxane resin remains absolutely unchanged. Therefore, the free-standing cured methylvinylpolysiloxane resin film of the present invention is suitable for the formation of electron patterns.

Practical Example 7

A silicon nitride film was deposited by a catalytic CVD method onto a 100 μm-thick free-standing film obtained in Practical Example 3. A 50 nm-thick layer was built-up under the following conditions: catalyst temperature 1840° C.; film-forming pressure 10 Pa; flow rate of $SiH_4$: 10 sccm [standard cubic cm per minutes]; flow rate of $NH_3$: 20 sccm; flow rate of $H_2$: 400 sccm; water cooling of the substrate holder. At the distance of 100 mm between the catalysts and the substrate, the film temperature in the deposition process became equal to 170° C., but there were not cracks, delamination, and curling. Observation of the deposited layer under an electron microscope showed structural uniformity and no defect.

Characteristics measured in the practical examples and comparative examples are shown in Table 1 and Table 2.

TABLE 2

|  | Practical Ex. 1 | Practical Ex. 2 | Practical Ex. 3 | Practical Ex. 4 | Practical Ex. 5 |
|---|---|---|---|---|---|
| Light Transmittance (%) | ≧85 | ≧85 | ≧85 | ≧85 | ≧85 |
| Dependence on Polarization Light |  |  | Not observed |  |  |
| Birefringence |  |  | Not observed |  |  |
| Glass Transition Point (° C.) | 111 | 140 | 226 | 323 | 221 |
| Coefficient of Thermal Expansion (ppm/K) | 152 | 127 | 138 | 190 | 142 |
| Young's Modulus (GPa) | 1.5 | 1.3 | 1.4 | 1.3 | 1.1 |
| Flexural Strength (MPa) | 56 | 48 | 50 | 43 | 39 |

TABLE 2

|  | Comp. Ex. 1 | Comp. Ex. 2 | Comp. Ex. 3 | Comp. Ex. 4 | Comp. Ex. 5 |
|---|---|---|---|---|---|
| Light Transmittance (%) | ≧85 | ≧85 | ≧85 | ≧85 | ≧85 |
| Dependence on Polarization Light |  |  | Not observed |  |  |
| Birefringence |  |  | Not observed |  |  |
| Glass Transition Point (° C.) | 82 | 69 | 60 | 130 | 100 |
| Coefficient of Thermal Expansion (ppm/K) | 250 | — | — | 210 | 250 |
| Young's Modulus (GPa) | 1.5 | 1.5 | 0.6 | 1.1 | — |
| Flexural Strength (MPa) | 47 | 44 | 17 | — | — |

INDUSTRIAL APPLICABILITY

Since the free-standing film of the present invention comprising a cured organopolysiloxane resin possesses excellent physical and mechanical properties, it can be used as an unsupported film, i.e., as a film without any supporting structure.

Since the material of the free-standing film of the present invention is cross-linked, it acquires high resistance to heat without the use of any heat-resistant agents.

The free-standing film of the present invention comprising a cured organopolysiloxane resin is transparent in the visible wavelength range and has low birefringence.

Another distinguishing feature of the film is that its light transmittance is not influenced by light polarization. Therefore, the film of the present invention can be used in applications that require optical transparency. Another feature is that the film has good applicability to polarization light and coherent light.

Transparency is available in a wide range of wavelengths, and the film can be used as a wavelength filter, or a similar optical elements.

The free-standing film of the present invention comprising a cured organopolysiloxane resin does not absorb ultraviolet light and has high stability against oxygen, since the unsaturated aliphatic hydrocarbon groups of component (A) are consumed by a hydrosilylation reaction with silicon-bonded hydrogen atoms of component (B).

Therefore, the free-standing film of the present invention is suitable for film-forming processes where layers are deposited onto the film from a gaseous phase. Normally, a thin layer of a metal oxide is deposited onto a film by a high-energy processes such as sputtering in a gaseous environment that contains oxygen, and there are cases when the aforementioned processes cause excitation and, hence, activation of the oxygen.

Under such conditions, the such film has to be highly stable against oxygen, and the free-standing film of the present invention comprising a cured organopolysiloxane resin is stable under the aforementioned film-forming conditions.

Therefore such a film is suitable for use as an optoelectronic element, e.g., a transparent electrode substrate film.

Since the free-standing film of the present invention has high resistance to heat and possesses specific properties inherent in cross-linked polysiloxane, i.e., insulation strength against voltage breakdown, without the use of additives, the free-standing film of the present invention can be used as an electronics material that requires high insulation properties, e.g., as a capacitor film.

The free-standing film of the present invention comprising a cured organopolysiloxane resin is transparent not only in the visible wavelength range but also in a wider area from near-ultraviolet to near-infrared bands. Therefore, when the aforementioned film is used for making a layered film composed of the film and a thin inorganic layer deposited onto the film and when the inorganic layer is used as a material of a transparent electrode material, the aforementioned layered film can be utilized as a transparent film for transparent electrodes of electroluminescence displays, liquid-crystal displays, or the like.

The layered films can also be used as various optical filters, reflective plates, or other film-like optical elements.

By adjusting resistance of the inorganic layer, it becomes possible to employ the layered films as antistatic means, electro-magnetic screens, etc.

By adjusting a refractive index, it is possible to impart to the inorganic-material layer functions of an anti-reflective film.

The free-standing film of the present invention comprising a cured organopolysiloxane resin has high stability against chemical treatment.

Therefore, the free-standing film of the present invention can be used in processes that involve etching, e.g., for partial removal of an inorganic layer during electrode patterning.

The invention claimed is:

1. A free-standing film comprising a cured organopolysiloxane resin, wherein the glass transition temperature of the cured organopolysiloxane resin is equal to or greater than 100° C. and the coefficient of thermal expansion at 100° C. is equal to or below 200 ppm/K, obtained by conducting a cross-linking reaction between
(A) an organopolysiloxane resin represented by the following average siloxane unit formula:

$$[R^1{}_aR^2{}_{3-a}SiO_{1/2}]_v[R^3SiO_{3/2}]_w \quad (1) \text{ or}$$

$$[R^1{}_aR^2{}_{3-a}SiO_{1/2}]_x[R^3SiO_{3/2}]_y[SiO_{4/2}]_z \quad (2)$$

where $R^1$ designates univalent hydrocarbon groups of one or more than one type selected from alkyl groups having 1 to 4 carbon atoms and univalent aromatic hydrocarbon groups having 6 to 8 carbon atoms; $R^2$ designates alkenyl groups having 2 to 6 carbon atoms; $R^3$ designates univalent hydrocarbon groups of one or more than one type selected from alkyl groups with 1 to 4 carbon atoms and univalent aromatic hydrocarbon groups having 6 to 8 carbon atoms; at least 50 mole % of $R^3$ groups being phenyl groups; "a" is 0, 1, or 2; $0.82 \leq w<1.0$ and $v+w=1$; $0<x<0.4$, $0.5<y<1$, $0<z<0.4$, and $x+y+z=1$; and
(B) an organosilicon compound that contains in one molecule two or more silicon-bonded hydrogen atoms, in which not less than 5 mole % of all silicon-bonded univalent groups are univalent aromatic hydrocarbon groups, in the presence of (C) a hydrosilylation catalyst.

2. The free-standing film of claim 1, wherein the cured organopolysiloxane resin does not have a specific light-absorption band in the visible-light range, has a light transmittance of 85% or higher at the wavelength of 400 nm, and a light transmittance of 88% or higher in the wavelength range of 500 to 700 nm.

3. The free-standing film of claim 1, wherein $0<x<0.3$, $0.65<y<1$, $0<z<0.2$ and $x+y+z=1$.

4. A process for manufacturing a free-standing film comprising a cured organopolysiloxane resin, wherein the glass transition temperature of the cured organopolysiloxane resin is equal to or greater than 100° C. and the coefficient of thermal expansion at 100° C. is equal to or below 200 ppm/K, comprising the steps of:
coating a cross-linkable organopolysiloxane resin composition comprising:
(A) an organopolysiloxane resin represented by the following average siloxane unit formula:

$$[R^1{}_aR^2{}_{3-a}SiO_{1/2}]_v[R^3SiO_{3/2}]_w \quad (1) \text{ or}$$

$$[R^1{}_aR^2{}_{3-a}SiO_{1/2}]_x[R^3SiO_{3/2}]_y[SiO_{4/2}]_z \quad (2)$$

where $R^1$ designates univalent hydrocarbon groups of one or more than one type selected from alkyl groups having 1 to 4 carbon atoms and univalent aromatic hydrocarbon groups having 6 to 8 carbon atoms; $R^2$ designates alkenyl groups having 2 to 6 carbon atoms; $R^3$ designates univalent hydrocarbon groups of one or more than one type selected from alkyl groups with 1 to 4 carbon atoms and univalent aromatic hydrocarbon groups having 6 to 8 carbon atoms; at least 50 mole % of $R^3$ groups being phenyl groups; "a" is 0, 1, or 2; $0.82 \leq w<1.0$ and $v+w=1$; $0<x<0.4$, $0.5<y<1$, $0<z<0.4$, and $x+y+z=1$; and
(B) an organosilicon compound that contains in one molecule two or more silicon-bonded hydrogen atoms, in which not less than 5 mole % of all silicon-bonded univalent groups are univalent aromatic hydrocarbon groups, and (C) a hydrosilylation catalyst onto a substrate to form an uncured film;

forming a cured film by cross-linking the aforementioned uncured film; and peeling the obtained cured film off from the substrate.

5. The process for manufacturing the free-standing film according to claim 4, wherein the cured organopolysiloxane resin does not have a specific light-absorption band in the visible-light range, has a light transmittance of 85% or higher at the wavelength of 400 nm, and a light transmittance of 88% or higher in the wavelength range of 500 to 700 nm.

6. A layered film comprising a free-standing film comprising a cured organopolysiloxane resin, wherein the glass transition temperature of the cured organopolysiloxane resin is equal to or greater than 100° C. and the coefficient of thermal expansion at 100° C. is equal to or below 200 ppm/K, obtained by conducting a cross-linking reaction between (A) an organopolysiloxane resin represented by the following average siloxane unit formula:

 (1) or

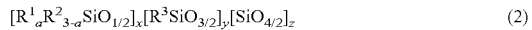 (2)

where $R^1$ designates univalent hydrocarbon groups of one or more than one type selected from alkyl groups having 1 to 4 carbon atoms and univalent aromatic hydrocarbon groups having 6 to 8 carbon atoms; $R^2$ designates alkenyl groups having 2 to 6 carbon atoms; $R^3$ designates univalent hydrocarbon groups of one or more than one type selected from alkyl groups with 1 to 4 carbon atoms and univalent aromatic hydrocarbon groups having 6 to 8 carbon atoms; at least 50 mole % of $R^3$ groups being phenyl groups; "a" is 0, 1, or 2; $0.82 \leq w < 1.0$ and $v+w=1$; $0 < x < 0.4$, $0.5 < y < 1$, $0 < z < 0.4$, and $x+y+z=1$; and (B) an organosilicon compound that contains in one molecule two or more silicon-bonded hydrogen atoms, in which not less than 5 mole % of all silicon-bonded univalent groups are univalent aromatic hydrocarbon groups, in the presence of (C) a hydrosilylation catalyst, and an inorganic layer on the free-standing film.

7. The layered film according to claim 6, wherein the inorganic layer is a deposited layer of a metal or a metal oxide.

8. The layered film according to claim 6, wherein the inorganic layer is a gas-barrier layer.

* * * * *